United States Patent [19]

Martin

[11] 3,896,766

[45] July 29, 1975

[54] COLLAPSIBLE ANIMAL CAGE OR THE LIKE

[75] Inventor: Harlan W. Martin, Earl Township, Pa.

[73] Assignee: Favorite Manufacturing, Inc., New Holland, Pa.

[22] Filed: Mar. 25, 1974

[21] Appl. No.: 454,266

[52] U.S. Cl. .......................... 119/17; 119/19; 220/7
[51] Int. Cl.² ............................................ A01K 1/02
[58] Field of Search ............. 119/17, 19, 18, 15, 21, 119/22; 220/4, 6, 7

[56] References Cited
UNITED STATES PATENTS

| | | | |
|---|---|---|---|
| 1,274,800 | 8/1918 | Sketteno | 220/7 |
| 1,521,936 | 1/1925 | Fadden et al. | 220/6 |
| 1,580,775 | 4/1926 | Baker | 119/17 |
| 1,825,504 | 9/1931 | Carr | 119/17 |
| 2,914,022 | 11/1959 | Hinton | 119/17 |
| 3,048,147 | 8/1962 | McKean | 119/19 |
| 3,497,127 | 2/1970 | Box | 220/6 X |

*Primary Examiner*—J. N. Eskovitz
*Attorney, Agent, or Firm*—John C. Thompson

[57] ABSTRACT

A collapsible animal cage formed of rectilinear welded wire fabric or the like. The cage has front and rear rectangular end wall structures movable between an erected position and a folded position overlying a litter tray on the bottom of the cage, side wall structures intermediately hinged between their tops and bottoms and foldable over the end wall structures, and a top hingedly secured to the top of the side wall structures. Means are provided to hold the various structures in their erected position in a relatively rigid manner. The front end structure has a foldable door which can be readily latched in its closed position or held in its open position. The litter tray can be readily removed from the cage when the parts are in their erected position.

11 Claims, 12 Drawing Figures

COLLAPSIBLE ANIMAL CAGE OR THE LIKE

FIELD OF THE INVENTION

The present invention relates generally to animal cages and other similar containers, and more particularly to an animal cage of the type which can be readily collapsed for transportation.

BACKGROUND OF THE INVENTION

Collapsible animal cages are presently commercially available and are well-known in the prior patent art. The following U.S. patents are considered representative of the prior art: Benson, U.S. Pat. No. 1,474,508 issued Nov. 20, 1923; Lang, U.S. Pat. No. 1,431,745 issued Oct. 10, 1922; and Fadden et al, U.S. Pat. No. 1,521,936 issued Jan. 6, 1925. These three patents all disclose collapsible wire work containers having hinged end members which are hinged either along their upper or lower edge, and side members which are secured by hinges to top and bottom members of the structure, the side members also being provided with a hinge midway between their top and bottom edges so that the sides can collapse inwardly towards each other as the top member moves towards the bottom member after the end panels have been swung to an out-of-the-way position. While these structures are somewhat satisfactory, they have various disadvantages, some of which are: they are difficult to construct in that they require special members; they are difficult to erect or to collapse; it is difficult to load the animals into or out of the erected structures; they are somewhat costly; and they cannot utilize lightweight materials when holding large animals due to their inherent lack of rigidity.

OBJECTS OF THE INVENTION

It is an object of the present invention to provide a collapsible animal cage or the like in which novel means are employed to hold the animal cage in its erected position, said novel means being of low cost, facilitating the assembly of the cage into its erected position, and serving to rigidify the erected structure.

It is another object of the present invention to provide a collapsible animal cage or the like which is formed of relatively light weight rectilinear welded wire fabric, the animal cage including foldable front and rear end members, foldable side members, and top and bottom members, wherein one of the foldable end members is provided with a foldable door structure of novel design which facilitates placing animals into and out of the cage.

It is another object of the present invention to provide a foldable animal cage or the like in which litter tray means are incorporated in a novel manner.

These and other objects and advantages of the present invention will be apparent to those skilled in the art after a consideration of the following detailed description taken in conjunction with the accompanying drawings.

DETAILED DESCRIPTION OF THE DRAWING

The collapsible animal cage or the like which could be used as a general purpose container, includes a generally rectangular floor structure indicated generally at 10, a generally rectangular top structure, indicated generally at 12, the top structure being of substantially the same overall dimensions as the floor structure, front and rear rectangular end wall structures, which are indicated respectively at 14 and 16, and a left hand and right hand rectangular side wall structures, indicated respectively at 18 and 20. All of the various structures 10, 12, 14, 16, 18, and 20 are made from rectilinear welded wire fabric or the like.

The rectangular floor structure has a plurality of longitudinally extending wires 22 which are welded to transversely extending wires 24. The left hand ends of the transversely extending wires are bent upwardly as at 26, and similarly the right hand ends of the wires 24 are bent upwardly as at 28. Right and left longitudinally extending side wires 30, 32 are secured to the upper edge of the bent portions 26, 28 and serve to form right and left peripheral edge portions of the rectangular floor structure. The longitudinally extending wires 22 have their rear end portions bent upwardly as at 34 and these rear end portions are secured to each other by a transversely extending wire 36, the transversely extending wire 36 forming a rear peripheral edge portion of the floor structure. A litter tray or the like 38 is carried by the wires 22, 24 in such a manner that its upper surface lies below the periphery of the side portions of the rectangular floor structure. The litter tray 38 is slidable through the forward opening in the floor structure as the forward end of the floor structure does not have a peripheral edge portion as can best be seen from FIG. 4.

The rectangular top structure 12 is formed of longitudinally and transversely extending wires 40, 42, a pair of the longitudinal wires 40R and 40L being disposed at the right and left sides of the top, and a pair of transversely extending wires 42F and 42R being disposed at the front and rear of the top.

Figure 1:
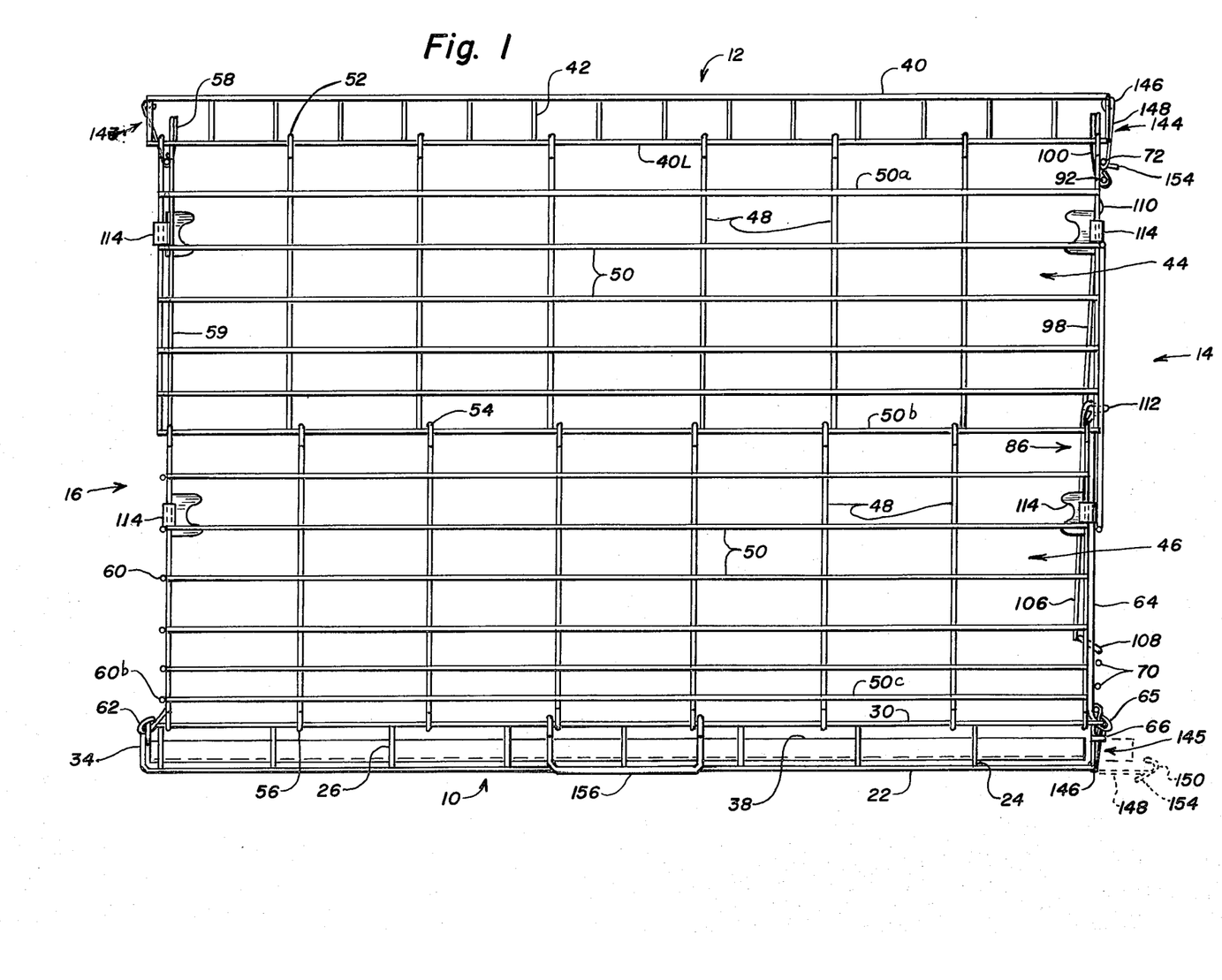
FIG. 1 is a side view of a collapsible animal cage or the like in which the principles of the present invention are incorporated.

The right and left hand rectangular side structures 18, 20 are substantially identical to each other. Each of the side members have upper and lower sections which are hingedly interconnected to each other about a horizontal hinge substantially midway between the top and the bottom of the side portions. Thus, with reference to the left hand side structure shown in FIG. 1, the side has an upper portion indicated generally at 44 and a lower portion indicated generally at 46, the upper portion being formed of a plurality of vertically extending wires 48 and a plurality of transversely extending wires 50. The vertical wires 48 extend above the uppermost transverse wire 50a and are bent about the longitudinally extending wire 40L which forms the associated peripheral edge wire on the top portion, the bend being best illustrated at 52 in FIG. 3 in such a manner that the longitudinally extending wire 40L serves as a hinge. The lower portion 46 of the side 18 similarly has vertical wires 48 and transverse wires 50, the upper end of the vertical wires 48 in the lower portion being bent about the lower most transverse wire 50b of the upper section in the manner shown at 54 in FIG. 3, the lowermost wire 50b serving as the intermediate hinge for the sides. The vertical wires 48 in the lower portion of the side member 46 extends below the lowermost transverse wire 50c and are bent about the longitudinally extending side wire 32 in such a manner that the side section can also hinge about the wire 32. The manner in which the lower end of the vertical wire 48 in the lower portion of the side member is bent is illustrated at 56 in FIG. 3.

Figures 6, 7, 8, 9, 10:
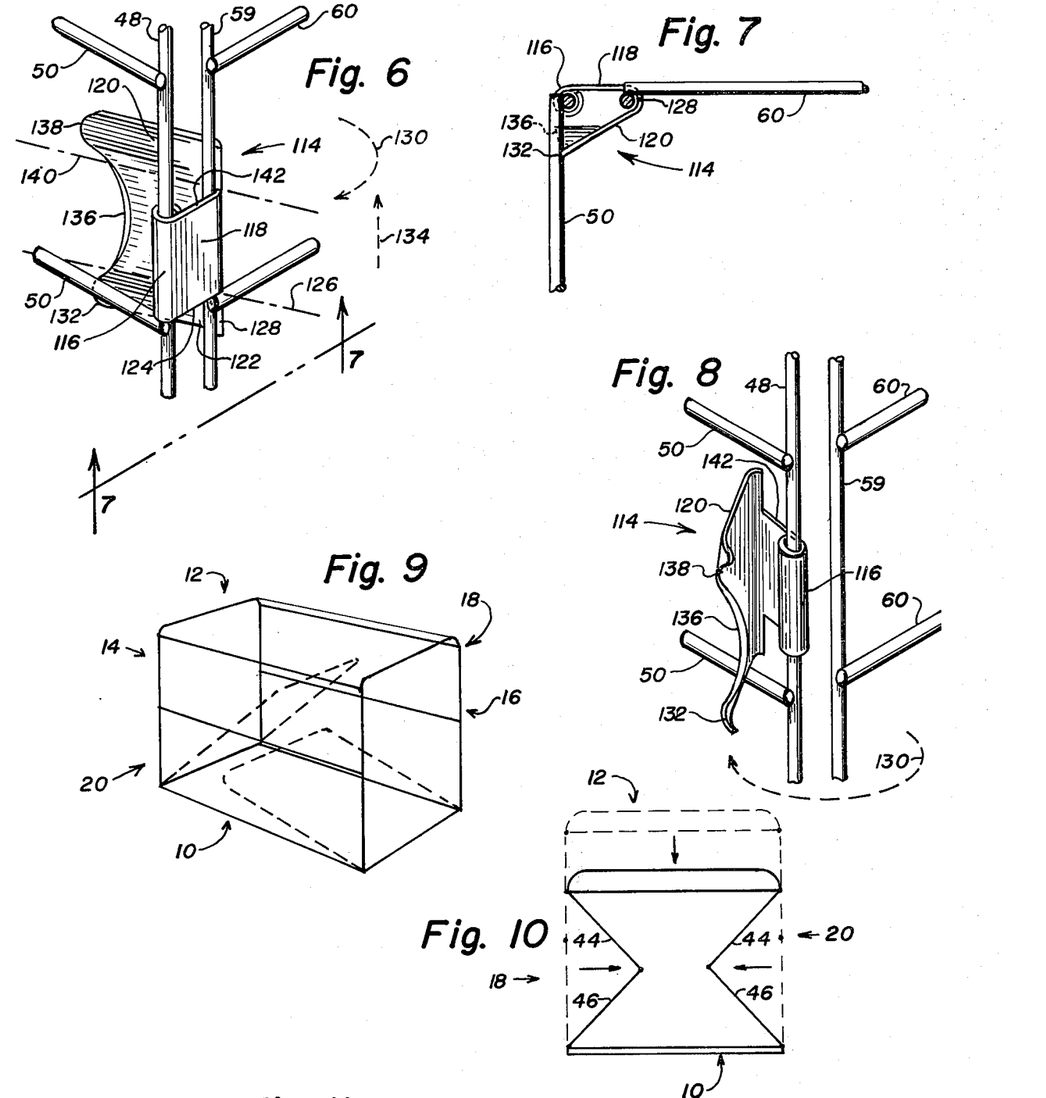
FIG. 6 is a perspective view of a portion of the animal cage showing the manner in which one of the clip members holds two juxtapositioned end and side members in their erected position.
FIG. 7 is a section taken generally along the lines 7—7 in FIG. 6.
FIG. 8 is a view similar to the perspective view shown in FIG. 6, the clip member being swung to a disengaged position.
FIG. 9 is a schematic perspective view illustrating the manner in which the front and rear end members are swung to their lowered position preliminary to collapsing the animal cage.
FIG. 10 is another schematic view illustrating the manner in which the side members are moved to their collapsed position.

At this point it should be apparent that (in the absence of interference with the end members 14, 16), the side structures could be collapsed by folding them inwardly towards each other in a manner schematically illustrated in FIG. 10 to collapse the structure.

Figure 3:
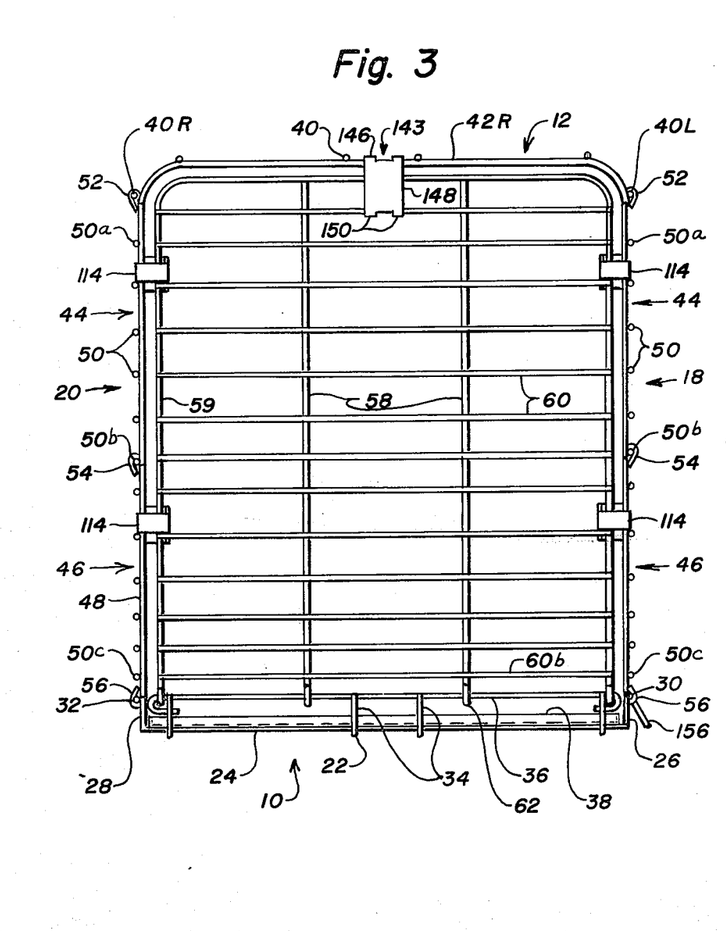
FIG. 3 is a rear end view of the collapsible animal cage shown in FIG. 1, this view being taken from the left of the structure shown in FIG. 1.

The rear rectangular end wall structure 16 is best illustrated in FIG. 3 and includes intermediate vertically extending wires 58 and transversely extending wires 60. A U-shaped wire 59 forms the side periphery of the rear end wall structure and also the top periphery of the rear end wall structure. The vertical wires 58 and the ends of the U-shaped wire 59 extend below the lowermost transverse wire 60b and are bent about the transversely extending wire 36 as can best be seen in FIG. 1. Thus, the transverse wire 36 forms the hinge for the rear end wall structure 16. The vertical wires 58, 59 which extend below the lowermost transverse wire 60b extends outwardly and downwardly as can best be seen in FIG. 1 for the purpose of permitting the end wall structure to lie substantially flat upon the litter tray 38 within the collapsible cage.

Figure 2:
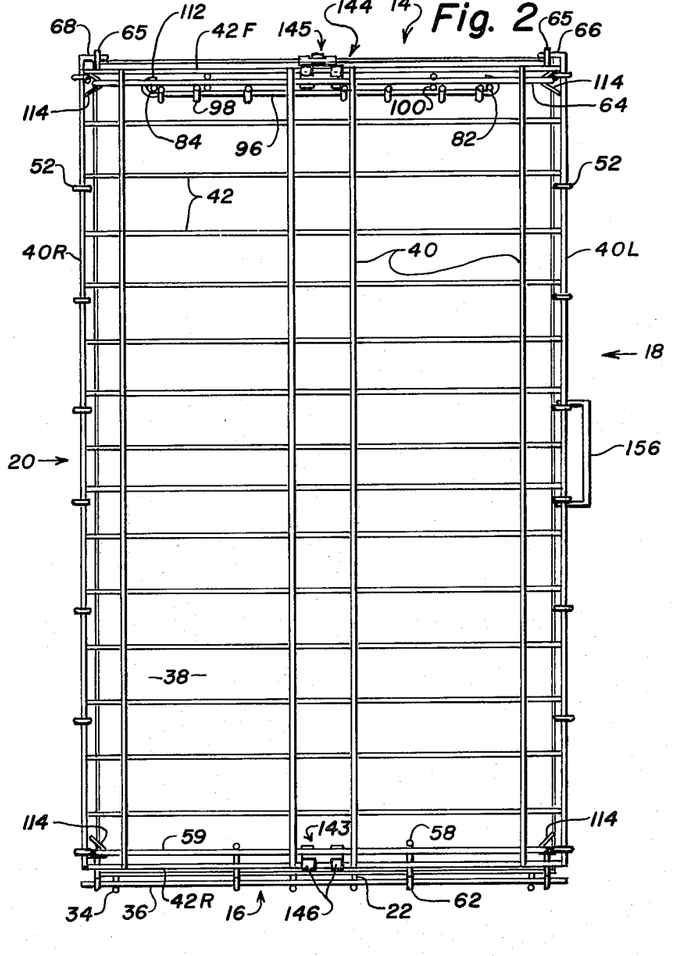
FIG. 2 is a top view of the animal cage shown in FIG. 1.
Figure 4:
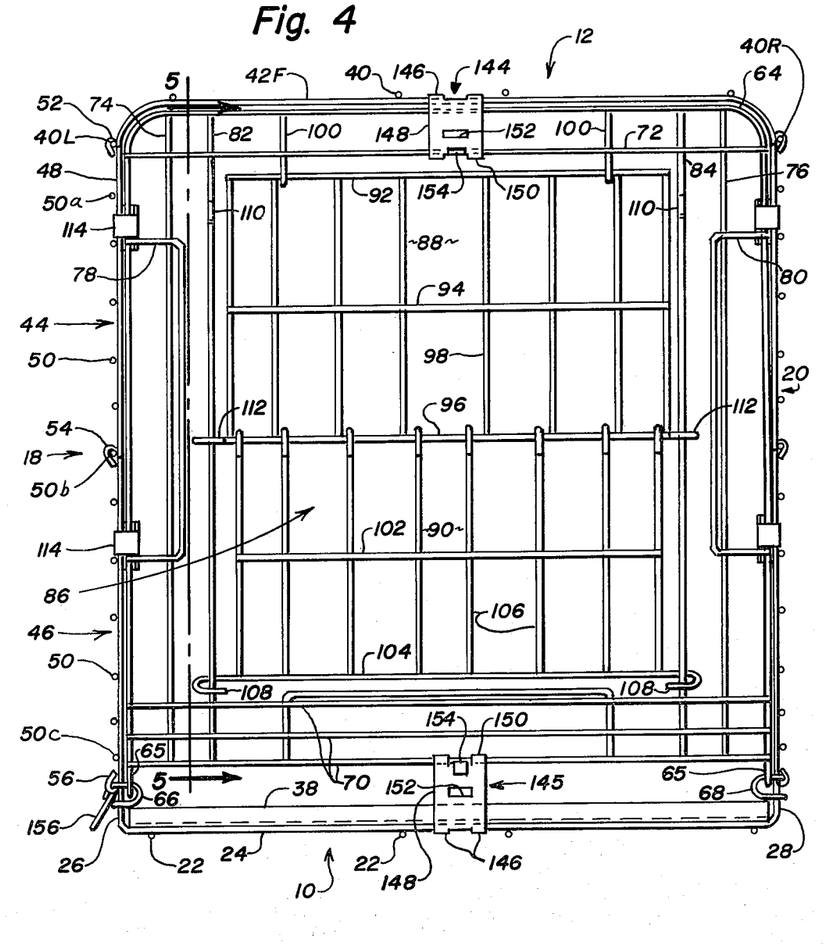
FIG. 4 is a front end view taken from the right of the structure shown in FIG. 1.

The front end wall structure 14 is best illustrated in FIG. 4. It includes a U-shaped peripheral wire 64 which extends upwardly from the lower left hand corner of the front end wall structure across the top and downwardly to the lower right hand corner of the front end wall structure. The ends of the peripheral wire 64 are bent at 65 about U-shaped extensions of the left and right longitudinally extending wires 30, 32, the U-shaped extension 66 of the wire 30 being bent inwardly towards the U-shaped extension 68 of the peripheral wire 32 as can best be seen from FIGS. 2 and 4. As can be seen from FIG. 1, the lower end of the peripheral wire 64 extends downwardly and outwardly so that when the front end wall structure is folded inwardly it will lie substantially flat upon the litter tray 38. Three transversely extending wires 70 interconnect the lower end portions of the peripheral wire 64. Similarly, an upper transverse wire 72 interconnects the upper vertical portions of the peripheral wire 64. Left and right hand vertical wires 74, 76 extend between the upper left hand and right hand corner of wire 64 and the lowermost of the transverse wires 70. Left and right U-shaped wires 78, 80 are welded at their ends to a vertical portion of peripheral wire 64 and also to an associated vertical wire 74, 76. Disposed inwardly of the bight portion of each of the U-shaped wires 78, 80 are left and right hand door frame wires 82, 84, the door frame wires being secured to the transversely extending wires 70, 72 but being free of any support between the upper transverse wire 72 and the uppermost of the lower transverse wires 70.

A foldable door indicated generally at 86 normally closes the opening between the door frame wires 82, 84, the upper transverse wire 72 and the uppermost of the lower transverse wire 70. The foldable door includes an upper section 88 and a lower section 90. The upper section includes upper, intermediate, and lower transversely extending wires 92, 94, 96, respectively, and a plurality of vertically extending wires 98, the various wires being secured to each other by welding or the like. The upper wire 92 is hingedly connected to the frame of the rear end wall structure by short vertical wires 100 whose upper ends are welded to the transverse portion of the peripheral frame wire 64 and the upper transverse wire 72, the lower end of the short vertical wires 100 being bent about the upper transverse wire 92 as at 101. The lower section 90 of the foldable door includes upper and lower transverse wires 102, 104, respectively, and a plurality of vertically extending wires 106, the upper end of the vertically extending wires being bent about the lowermost transverse wire 96 of the upper section to form a hinge about the lowermost wire 96.

Figure 5:
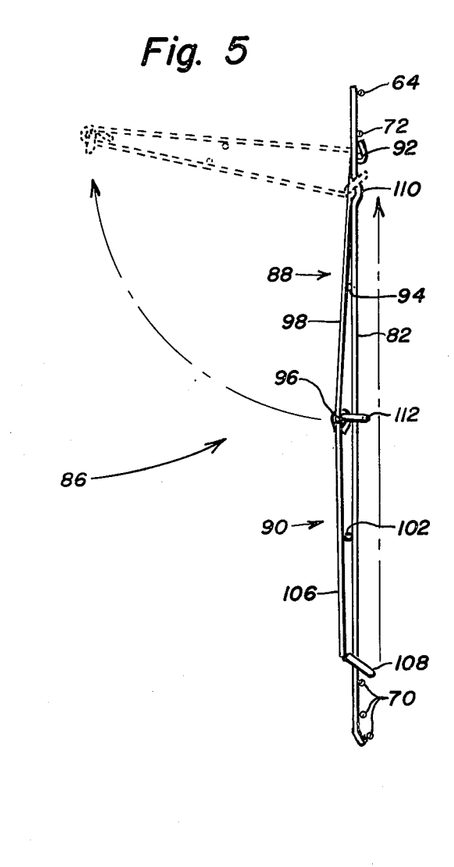
FIG. 5 is a section taken generally along lines 5—5 in FIG. 4, the door being shown in its open folded position in broken lines.

As can be seen from FIG. 5 the door may be swung from the lower closed position, indicated in full lines, to a raised open position, indicated in broken lines, by swinging the door about the hinges 92, 96. As the door moves upwardly the lower edge of the door is held in line with the door frame wires 82, 84 by U-shaped extension 108 of the lower transverse wire 104, the U-shaped extension being disposed about the door frame wires 82, 84. To maintain the door in its raised upper position a kink 110 is formed in each of the door frame wires adjacent the upper end, the kink being engaged by the lower transverse wire in such a manner that the door will be maintained in its raised position. The lower transverse wire 96 is also provided with U-shaped extensions or hooks at each end in order to maintain the door in its closed position, the U-shaped extensions being disposed about the door frame wires 82, 84 when the door is in its closed position. In this connection, it should be noted that the door frame wires 82, 84 can be resiliently distorted to permit the end of the U-shaped extension 112 to be moved from behind the door frame wire as it would be when in the folded raised position shown in broken lines in FIG. 5 to be in front of the wire when in the lower position as indicated in full lines in FIGS. 4 and 5. Thus, the U-shaped extensions 112 or hooks which extend outwardly of the hinge 96 will hold the foldable door in its closed position until they are disengaged.

Means are provided to hold the sides and ends in their erected position, these means comprising a plurality of clip members 114 which is utilized to hold the rear end wall structure 16 to the right rectangular side structure 20. While the clip 114 will be described in association with these members it should be appreciated that the clip functions in the same manner in all locations in that it is adapted to interconnect all adjacent pairs of vertical peripheral wires. The clips as shown are made from a single piece of sheet metal which is formed into the desired final shape. However, the clip could be made from several parts which are joined together. Each clip has a first barrel-shaped mounting part or portion 116 which is disposed about a vertical wire 48 for vertical sliding motion and for transverse rotatable motion. A transversely extending portion 118 extends away from the first portion 116, the transversely extending portion being of the same vertical dimensions as the sleeve 116. Another portion 120 is disposed relative to the transversely extending portion at an enclosed angle of approximately 45° to 60°. The opposed adjacent surfaces of the portions 118 and 120 are adapted to engage the adjacent vertical peripheral wire 58 to hold the side and end in their erected position when the clip is in the first position shown in FIG. 6. However, the clip is movable to a second position, shown in FIG. 8 wherein the adjacent vertical peripheral wire 58 is not contacted. When all the clips are in the second position the container can be shifted to its collapsed position by initially folding in the ends, and then the sides. Each clip is provided with locking means which lock the clip in its first position. In this regard it should be observed that the portion 120 has a locking section which extends vertically beyond the edges of the transversely extending portion 118, the locking section 122 of the portion 120 lying below the horizontal plane of the lower edge 124 of the portion 118, the locking section serving a locking function and also a bracing function, (the plane of the lower edge being indicated by the broken line 126). Thus, when the clip is in its first or FIG. 6 position, the vertical edge 128 of the locking section 122 bears against the horizontal wire 60 preventing the clip from being rotated in the direction indicated by the arrow 130 to the second position shown in FIG. 8. The locking section 122 also serves to brace and further rigidify the container when the clip is in the position shown in FIGS. 6 and 7. Thus, the other edge 132 of section 122 bears against the horizontal wire 50 at the same time the edge 128 is bearing against the wire 60.

To move the clip out of its unlocking position it is first necessary to shift the clip member 114 from its first position vertically in the direction indicated by the arrow 134 to an intermediate position and then rotate it in the direction indicated by the arrow 130 to the second position. To facilitate vertical movement a thumb grip 136 is formed on portion 120.

A section 138 is included in portion 120, the section 138 being essentially a mirror image of section 122. Section 138 lies above the plane 140 formed by the top horizontal edge 142 of portion 118. The locking section 138 permits the same form of clip 114 to be utilized in all locations as the clip may now be reversed. The section of the portion 120 which lies between the locking sections 122 and 138 serves as a holding section when the clip is in either its first or intermediate position.

Figure 11:
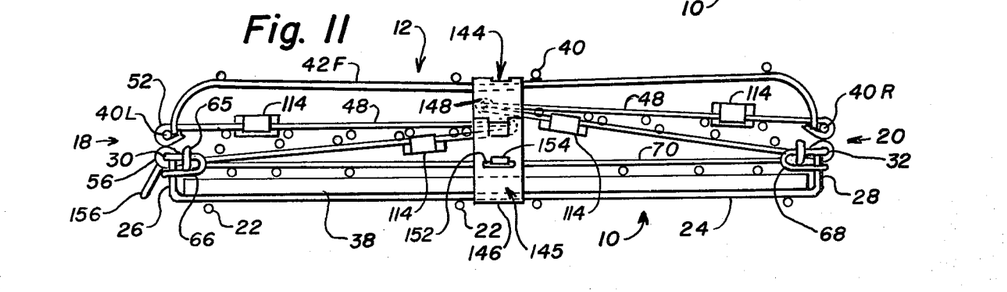
FIG. 11 is a front end view showing the animal cage in its collapsed position.
Figure 12:
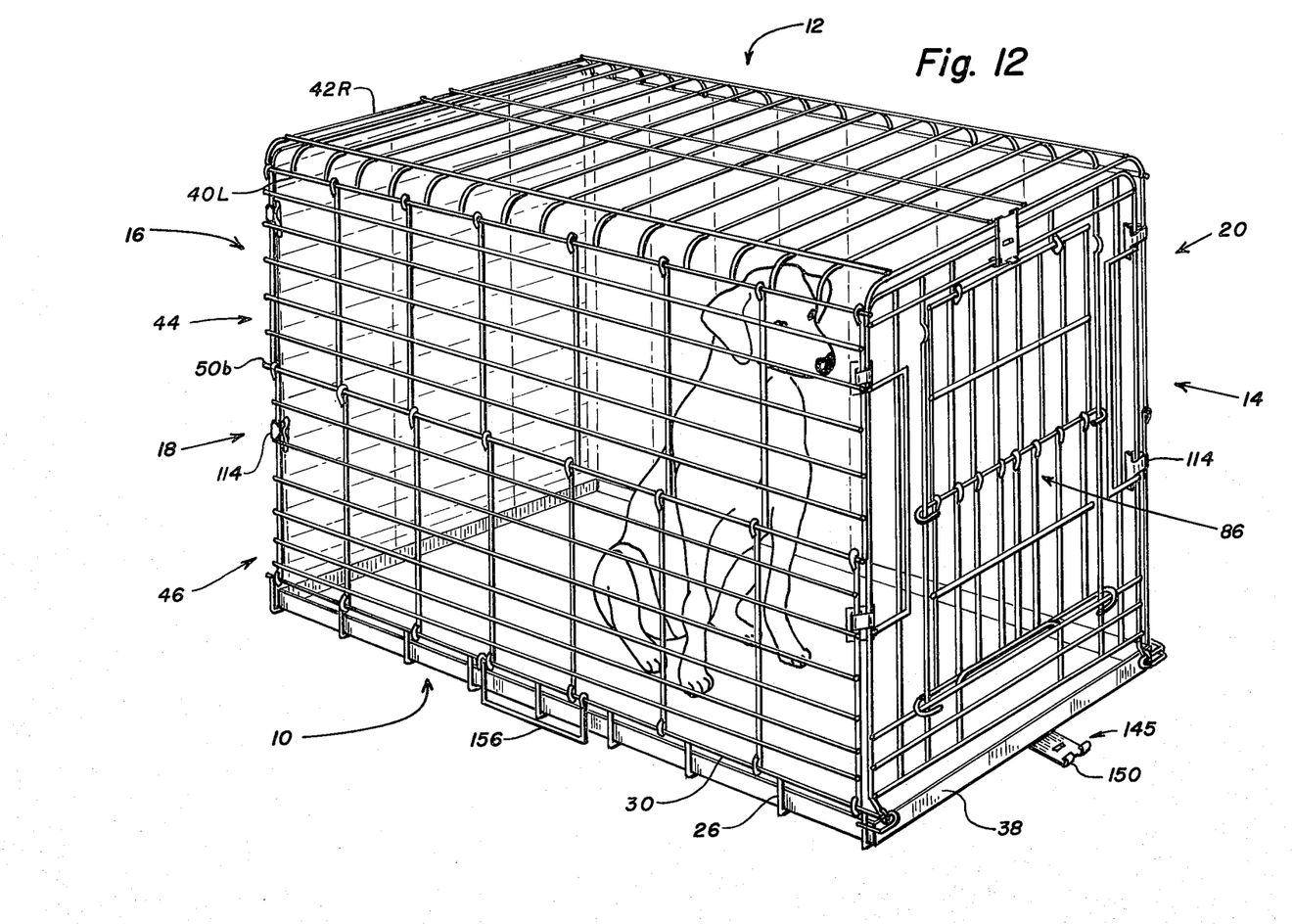
FIG. 12 is a perspective view of the collapsible animal cage in its erected position, some parts being eliminated for purposes of clarity.

In addition to the clip members 114, three additional clips or fasteners are provided, the additional clips, which are indicated generally at 143, 144, and 145, being substantially identical to each other. Clip 144 is mounted on a mid-portion of the front transverse wire 42F and another clip 143 is mounted on a mid-portion of the rear transverse wire 42R. The purpose of the clips 143, 144 is to be selectively engagable with the top transverse wire of the front and rear end structures to further rigidify the collapsible container when it is in its erected position, the fastener means 143, 144 also being engagable with associated structure to maintain the collapsed container in its collapsed position. Each of the identical fasteners 143, 144 is provided with a barrel-shaped portion 146 which is hinged about the associated transverse wire 42, an intermediate strap portion 148, and a hook portion 150 on the strap portion 148 which is remote from the barrel-shaped portion 46. The hooks 150 for the top two fasteners 143, 144, are selectively engagable with a transverse wire on the front or rear end structures, thus, the top front clip 144 has a hook engagable with the top transverse wire 72 as can be seen in FIG. 4, and the top rear fastener 143 has a hook 150 engagable with one of the transverse wires 60 as can best be seen in FIG. 3. The third fastener 145 has its barrel-shaped portion disposed about the front transverse wire 24 of the floor and its hook portion 150 is selectively engagable with the lower most transverse wire 70 of the front end structure when the parts are in their erected position. Thus, the lowermost clip 145 will serve to hold the litter tray within the cage when it is in its raised position as shown in FIG. 4, but will permit the litter tray to be slid out of the cage when it is swung to a lower position as indicated in broken line in FIG. 1. Each of the fasteners is provided with a transverse aperture 152 and a reversely extending hook 154. When the collapsible cage is collapsed in the manner indicated in FIG. 11, the reverse hook 154 of the top front fastener 144 is positioned within the aperture 152 of the lower front clip 145 to maintain the cage in its lower collapsed position. At the same time the top rear fastener 143 is disposed with its hooks 150 in engagement with the transversely extending wire 36 of the floor structure.

To facilitate transportation of the collapsible animal cage a handle 156 is provided, the handle being secured to one of the longitudinally extending peripheral wires 32.

The manner in which the collapsible animal cage is erected and subsequently collapsed should be apparent from the foregoing.

While the preferred structure in which the principles of the present invention have been incorporated as shown and described above, it is to be understood that the invention is not to be limited to the particular details, shown and described above, but that, in fact, widely different means may be employed in the practice of the broader aspects of the invention.

What is claimed is:

1. In a collapsible animal cage or the like including:
    a rectangular floor structure;
    a rectangular top structure;
    front and rear rectangular end wall structures
        hingedly interconnected at their bottoms to opposed ends of the rectangular floor structure and swingable between an upright erected position wherein they are vertically disposed, and a lowered collapsed position wherein they are horizontally disposed over said floor structure;

right and left hand rectangular side structures hingedly interconnected at their tops and bottoms to the top and floor structures, respectively, each of said side structures having horizontal hinge means substantially midway between the top and the bottoms, said side structures being swingable between an upright erected position wherein they are vertically disposed and a lowered collapsed position wherein they are horizontally disposed in a folded position over said floor structure;

all of said side and end structures being formed of rectilinear welded wire fabric or the like having horizontal and vertical wires, the periphery of said side and end structures being horizontal and vertical wires of said wire fabric;

the combination therewith of means to hold said side and end structures in their erected position comprising:

a plurality of clip members adapted to interconnect all adjacent pairs of vertical peripheral wires, each of said clip members being provided with a holding section, a locking section, and a mounting portion remote from the holding and locking sections, the mounting portion being journalled for both rotational and vertical movement about one vertical peripheral wire of a pair of adjacent vertical peripheral wires, each of said clip members being vertically shiftable from a first locking position to an intermediate position, and rotatable from the intermediate position to a second position, the holding section engaging the other vertical peripheral wire of said pair of adjacent vertical peripheral wires and the locking section engaging an associated horizontal wire when the clip member is in the first position whereby the clip member is held from rotational movement, the holding section engaging said other vertical peripheral wire and the locking section no longer engaging the associated horizontal wire when the clip member is in the intermediate position whereby the clip member is free to rotate to the second position, and said other vertical peripheral wire not being contacted by the holding section when the clip member is in the second position whereby the animal cage may be shifted to its collapsed position.

2. The collapsible animal cage or the like set forth in claim 1 wherein the mounting portion and the holding and locking sections of said clip member are fixed relative to each other, the mounting portion being a sleeve vertically shiftable about said one vertical peripheral wire to dispose the locking section into and out of its locking position adjacent said horizontal wire.

3. The collapsible animal cage or the like set forth in claim 2 wherein said locking section extends between horizontal wires of said side and end members when the clip member is in its locking position to brace and further rigidify said animal cage.

4. The collapsible animal cage or the like set forth in claim 1 in which each of the ends of the top structure is provided with fastener means selectively engagable with the top of said end structures to further rigidify said container when it is in its erected position, one of said fastener means also being engagable with one of the ends of said floor structure to maintain the collapsible container in its collapsed position.

5. The collapsible animal cage or the like set forth in claim 1 wherein each of said clip members is further characterized by the provision of a transversely extending portion extending away from the mounting portion, the holding section and the locking section being disposed at an angle to the transversely extending portion at a location remote from said mounting portion, said holding section lying between the edges of the transversely extending section, and said locking section lying beyond an edge of the transversely extending section, a vertical edge of the locking section being adapted to bear against an associated horizontal wire of said wire fabric to prevent the clip from being rotated when the clip is in its first position.

6. A collapsible animal cage or the like formed of rectilinear welded wire fabric or the like comprising:

rectangular top and floor structures;

front and rear rectangular end wall structures hingedly interconnected at their bottoms to ends of the rectangular floor structure and swingable between an upright erected position wherein they are vertically disposed and a lower collapsed position wherein they are horizontally disposed over said floor structure, said front end wall structure being provided with a rectangular opening therein, there being door frame wires extending the full length along the sides of the opening;

a foldable door hingedly interconnected at its top to said front end wall structure adjacent the top of said rectangular opening, said foldable door including a top member having a lower transversely extending hinge wire and a bottom member hinged to said hinge wire, the ends of said hinge wire being provided with outwardly extending hooks which are interengagable with said door frame wires to hold the door in its closed position, and guide wire means carried by the lower peripheral edge of the foldable door, said guide wire means being slidable up and down the door frame wires for substantially the entire length of the rectangular opening within said front end wall structure;

right and left rectangular side structures hingedly interconnected at their tops and bottom to the top and floor structures, respectively, each of said side structures having horizontal hinge means between the top and bottom, said side structures being swingable between upright erected positions wherein they are vertically disposed and a lower collapsed position wherein they are horizontally disposed in a folded position over said floor structure;

the periphery of said sides and end structures being horizontal and vertical wires of said rectilinear welded wire fabric; and a plurality of vertical clip members adapted to be disposed in a first position wherein they interconnect all adjacent pairs of vertical peripheral wires to hold said sides and ends in their erected position, said clip members being disposable in a second position wherein only one of the adjacent pairs of vertical peripheral wires are contacted by the clip members permitting the collapsible animal cage to be moved to its lowered collapsed position.

7. The collapsible animal cage or the like set forth in claim 6 wherein said door frame wires are provided with a kink adjacent the top of the door frame wire, said kink being engagable by said guide wires to hold the foldable door in open position.

8. A collapsible animal cage or the like comprising:
a rectangular floor structure having upwardly extending peripheral edge portions;
a litter tray or the like mounted on said floor structure in such a manner that its upper surface lies below the upper periphery of the side portions, said litter tray or the like being slidable through an opening in said peripheral edge portions of the floor structure;
a rectangular top structure;
front and rear rectangular end wall structures hingedly interconnected at their bottoms to the peripheral edge portion of the rectangular floor structure and swingable between an upright erected position wherein they are vertically disposed above the ends of the rectangular floor structure and a lowered collapsed position where they are horizontally disposed over the litter tray or like object;
right and left hand rectangular side structures hingedly interconnected at their top to said top structure and also hingedly interconnected at their bottom to the peripheral edge portions of said floor structure, each of said structures having horizontal hinge means between the top and bottom, said side structure being swingable between an upright erected position wherein they are vertically disposed above the side edges of the floor structure and a lower collapsed position wherein they are horizontally disposed in a folded position over said litter tray; and
means operable to hold said sides and ends in their erected position.

9. The collapsible animal cage or the like as set forth in claim 8 wherein each of the front and rear rectangular end wall structures have a lower outwardly and downwardly extending portion which is hingedly interconnected to the peripheral edges of the floor structure, the parts being so arranged and constructed that the end wall structures may lie substantially flat upon the litter tray or like object.

10. The collapsible animal cage or the like set forth in claim 8 wherein a lower fastener means is secured to said floor structure midway within the opening in the peripheral edge which permits the litter tray to be slid along said floor structure, said lower fastener means being interconnectable with one of said end wall structures to maintain said litter tray within the collapsible animal cage.

11. The collapsible animal cage or the like set forth in claim 10 wherein said top structure is provided with upper fastener means which is adapted to engage the top portion of one of the end wall structures when said animal cage or like object is in its erected position, said upper fastener means also being engagable with the lower fastener means to facilitate maintaining the animal cage or the like in its collapsed position.

* * * * *